(12) United States Patent
Watt et al.

(10) Patent No.: US 9,203,710 B2
(45) Date of Patent: Dec. 1, 2015

(54) LOCATION OF EQUIPMENT BY ITS IP ADDRESS

(75) Inventors: Idy Watt, Issy les Moulineaux (FR); Nicolas Bellardie, Puteaux (FR); Boris Pinatel, Paris (FR)

(73) Assignee: Orange, Paris (FR)

( * ) Notice: Subject to any disclaimer, the term of this patent is extended or adjusted under 35 U.S.C. 154(b) by 184 days.

(21) Appl. No.: 13/878,441

(22) PCT Filed: Oct. 3, 2011

(86) PCT No.: PCT/FR2011/052293
§ 371 (c)(1),
(2), (4) Date: Apr. 9, 2013

(87) PCT Pub. No.: WO2012/049398
PCT Pub. Date: Apr. 19, 2012

(65) Prior Publication Data
US 2013/0194960 A1  Aug. 1, 2013

(30) Foreign Application Priority Data
Oct. 11, 2010 (FR) ...................................... 10 58231

(51) Int. Cl.
*H04L 12/26* (2006.01)
*H04L 12/24* (2006.01)
*H04L 12/28* (2006.01)

(52) U.S. Cl.
CPC .............. *H04L 43/04* (2013.01); *H04L 12/24* (2013.01); *H04L 12/2878* (2013.01); *H04L 41/00* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 2003/0218570 A1* | 11/2003 | Moore et al. .................. | 342/465 |
| 2005/0260973 A1* | 11/2005 | van de Groenendaal ..... | 455/411 |
| 2006/0098670 A1* | 5/2006 | Voit et al. ...................... | 370/401 |
| 2006/0293062 A1* | 12/2006 | Krannich et al. .......... | 455/456.1 |
| 2007/0218920 A1* | 9/2007 | Bolin ......................... | 455/456.1 |
| 2007/0270164 A1* | 11/2007 | Maier et al. ................. | 455/456.2 |
| 2008/0095188 A1* | 4/2008 | Remy et al. ................... | 370/468 |
| 2008/0292064 A1* | 11/2008 | Wu et al. ..................... | 379/22.04 |
| 2009/0092134 A1* | 4/2009 | Herrera Schuvab .......... | 370/389 |
| 2009/0103559 A1* | 4/2009 | Pickering et al. ............. | 370/463 |
| 2010/0150012 A1* | 6/2010 | Lee ............................... | 370/252 |
| 2011/0040858 A1* | 2/2011 | Gum ............................ | 709/222 |
| 2012/0039187 A1* | 2/2012 | Yang et al. .................... | 370/249 |
| 2012/0155618 A1* | 6/2012 | Hart et al. .................. | 379/27.01 |

FOREIGN PATENT DOCUMENTS

EP   1 388 953 A1   2/2004

* cited by examiner

*Primary Examiner* — Chi H Pham
*Assistant Examiner* — Vladislav Agureyev
(74) *Attorney, Agent, or Firm* — Drinker Biddle & Reath LLP

(57) ABSTRACT

A technique for locating equipment connected via a high-speed line to a distributor device of fixed and predetermined position. The technique involves measuring signal attenuation between the equipment and the distributor device, and estimating the position of the equipment relative to the distributor device, deduced from this attenuation measurement.

11 Claims, 2 Drawing Sheets

LOCATION OF EQUIPMENT BY ITS IP ADDRESS

CROSS-REFERENCE TO RELATED APPLICATIONS

This application is the U.S. national phase of the International Patent Application No. PCT/FR2011/052293 filed Oct. 3, 2011, which claims the benefit of French Application No. 1058231 filed Oct. 11, 2010, the entire content of which is incorporated herein by reference.

FIELD

The invention relates to determining the location of equipment, based on the IP address of this equipment (IP for "Internet Protocol").

BACKGROUND

There is increasing demand for reliable techniques which allow obtaining the location of a user of a telecommunications terminal. In fact, with the marked expansion in location-based services (LBS), we are seeing increased user demand for a rapid determination of their location in a precise manner and with a low failure rate.

Frequently used location solutions are:
- those based on satellite systems,
- those based on mobile networks, and
- those based on the Internet.

Location solutions based on satellite systems, such as the American GPS (Global Positioning System) system, are used by terminals equipped with GPS receiving means that can decode the synchronization signals sent by the satellites in order to deduce their position, subject to visibility by at least three satellites. Due to this, although this method is effective in terms of accuracy, it only works in certain types of environments (where the sky is directly visible) and with a limited number of terminals.

In location solutions based on mobile networks (GSM, UMTS, etc.) or local area networks (WLAN, for example WiFi), determining the location of the mobile terminals is based solely on two principal mechanisms such as:
- using indications of the strength of the signals received, and
- using the identifier for the cell to which the terminal is connected.

In the first technique given above, indications of the strength of the signals received from fixed transmitters or access points or base stations (RSS technique, for "Received Signal Strength") are used. Several location methods have been developed that are based on this received signal information. The most common is based on creating a database of RSS vectors corresponding to a spatial discretization. The principle of this method, commonly called calibration (or fingerprinting) or sampling, is:
- to find the best correspondence between the RSS vector measured by the mobile terminal (signal level measured at a given location) and those stored in a database, then estimating the location based on this correspondence.

This method must necessarily be accompanied by a continuous exchange between the terminal and the dedicated server hosting the correspondence database in the network.

The second of said location techniques uses the identifier of the cell to which the mobile terminal to be located is connected. In fact, each mobile terminal "grabs" a cell in order to exchange data or send/receive voice calls via the mobile network. Each cell corresponds to a base station or access point for which the coordinates are only known by the equipment in the network. Due to this, in order to find out its location, a mobile terminal must send the cell identifier (for the cell where it is located) to a dedicated platform in the network. This platform returns the position associated with the base station to the mobile terminal. Several disadvantages result from this arrangement:
- imprecision (compared to other location techniques), and
- high latency times (due in particular to the response time of said platform).

Internet-based location solutions, which use the IP address associated with the user terminal (PC or mobile), make use of mechanisms which allow associating an IP address with the location of the last public router for which the location is known in the Internet wide area network. Due to this, the accuracy is clearly still less precise than values obtained by techniques such as those presented above. The level of accuracy typically is regional (or departmental in France), in cases where the location can even be obtained.

SUMMARY

The invention aims to improve this situation.

In particular, it proposes improving the precision of this last type of location determination, based on the IP address of the user equipment (particularly a terminal). For this purpose, the invention relates to a method for determining the location of equipment connected via a high-speed line to a distributor device of fixed and predetermined position, said method comprising:
- a measurement of signal attenuation between the equipment and the distributor device, and
- an estimation of the position of the equipment relative to the distributor device, deduced from this attenuation measurement.

The invention therefore proposes the use of measurements on signals, for example xDSL or ADSL (Asynchronous Digital Subscriber Line), between said equipment (for example but not necessarily the terminal of a user) and a distributor device such as, for example, a DSLAM multiplexer (Digital Subscriber Line Access Multiplexer) which serves a subscriber using an ADSL line with an identified IP address.

As the location (geographical position) of DSLAM type equipment is known and fixed, it is possible to determine the rough position of the subscriber. However, in the meaning of the invention, the precision of the location is advantageously improved by using attenuation measurement mechanisms. In particular, as described below as an example, speed measurements are obtained, which allows fine-tuning the estimation of the distance between the equipment of the subscriber and the geographical position of the distributor device. Thus in one example embodiment, the attenuation measurement comprises measuring the speed on a high-speed line established between the distributor device and the equipment.

One thus obtains a location within a thin ring (a ring width of only a few hundred meters) instead of a location within a disk-like region around the distributor having a radius of several kilometers, as we will see below with reference to FIG. 1. In one embodiment, this location can be further reduced to one sector of the ring, with the precision corresponding to a limited region due to using information on the approach angle between the DSLAM distributor and the equipment using the ADSL line. This approach angle information may, for example, be deduced from the directions of the trenches made when installing the local loop (pair of copper wires) between the distributor and the residence of a given user. Typically one can make use of a map of these trenches, or of tests conducted on site. In addition, the local loop may also, in certain cases, comprise a local loop using radiofrequencies, therefore without wired connections between the distributor and the home of the subscriber. In this case, said angle measurements can be deduced from a sector that covers a transmitting antenna used to broadcast the radiofrequency signals from the distributor to a receiving antenna near the home of the subscriber. This is therefore a possible variant for mapping the approach angle measurements.

In one possible embodiment, in order to pinpoint a location to within a sector, the method can then generally comprise:
    mapping beforehand the signal attenuation around at least one distributor device, and
    determining the current location of the equipment within a sector around the distributor, by said attenuation measurement.

This mapping can be established by test measurements around the distributor device or by the topology configuration of the network around the distributor device.

The equipment of the user can be a terminal using an IP address attributed for at least one given communication. Thus, at least one IP address is assigned to the equipment and the equipment, in communications, then uses this IP address, the method comprising an attenuation measurement for this IP address currently being used, in order to determine the location of the equipment.

In one particular embodiment (specifically when the equipment is a gateway between a local area network to which at least one terminal is connected and a wide area network), a set of predetermined IP addresses can be assigned to the equipment, and the equipment, in operation, uses at least one of these predetermined IP addresses, said method then comprising:
    a dynamic determination of the IP address currently being used by the equipment, and
    an attenuation measurement, for this IP address currently being used, in order to determine the location of the equipment.

Known location technologies based on the Internet IP use a database containing a correspondence between an IP address and the location of the last Internet router for which the location is known. This type of database, essentially static, limits the possibilities of providing location information that is up to date and of acceptable precision. Advantageously, in this embodiment of the invention, an approach based on dynamically collected IP address data allows reducing the uncertainty in the location determination.

In an example embodiment in which the equipment comprises a gateway to a short-range local area network, it is additionally possible to determine the location of a terminal connected to this short-range network. The method then additionally comprises determining the location of a terminal connected by the short-range network to the equipment. In particular, the location of the terminal is comparable to that of the gateway. In fact, the location of the gateway is determined first. Thus any terminal then identified by its IP address in the short-range network around the gateway is determined as being located within a zone in immediate proximity to the gateway, because the network has a short range (several dozen meters). The position of the terminal is then considered as corresponding to that of the gateway, with a low degree of uncertainty (corresponding to these few dozen meters).

In such an embodiment where a plurality of terminals can be connected to the equipment by the short-range network, a set of predetermined IP addresses is assigned to the equipment and the equipment assigns to each terminal one of said predetermined IP addresses. The method then comprises:
    a dynamic determination of each IP address in the set currently being used by a terminal, and
    an attenuation measurement, for each IP address currently being used, in order to determine the location of each terminal connected to the equipment by the short-range network.

The invention also relates to an element of a wide area telecommunications network, intended to be connected to a distributor device of the type mentioned above. In particular, the network element comprises means for measuring the signal attenuation between telecommunications equipment connected via a high-speed line to this distributor device, in order to implement the method presented above. This network element in the meaning of the invention may additionally comprise means for estimating the location of the equipment, deduced from the attenuation measurements, particularly in the case where the network element is in the form of a dedicated service platform as described below in an example embodiment.

The invention also relates to a computer program comprising instructions which, when run by a processor, implement the method presented above. In one example embodiment, this program can be installed on a platform of the abovementioned type. FIG. 2, which is presented below, can be a flowchart of the general algorithm for such a program.

BRIEF DESCRIPTION OF THE DRAWINGS

Other features and advantages of the invention will be apparent from reading the following description of some possible example embodiments, and from examining the attached drawings, in which.

DETAILED DESCRIPTION

Figure 1:
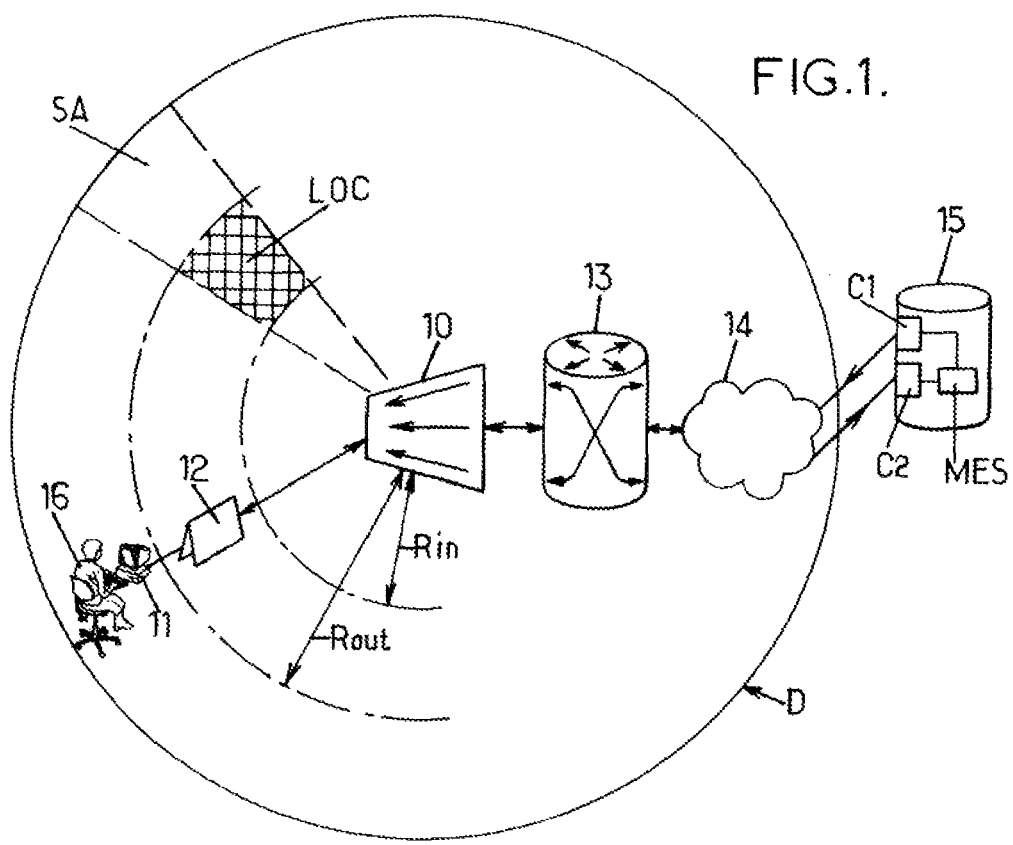
FIG. 1 schematically illustrates equipment 11 connected to a distributor 10 and which can thus be located within a ring portion LOC, in the meaning of the invention.

A distributor device 10 is represented in FIG. 1, for example a DSLAM (Digital Subscriber Line Access Multiplexer), to which is connected the equipment 11 of a user 16 (for example a PC computer) that has a connection to the Internet 14 and which therefore has an assigned IP address. The equipment 11 is then connected to the distributor device 10 by a high-speed connection, for example xDSL or ADSL (Asynchronous Digital Subscriber Line), via a gateway 12 between a local area network and the Internet 14 in the example represented.

The distributor device 10 is connected to the Internet 14 via a server 13 (for example a BRAS—Broadcast Remote Access Server) in the example represented, and possibly via one or more IP routers (not represented).

In particular, one can see a region D in FIG. 1 representing the range of the distributor 10 for providing a high-speed connection for all the telecommunications equipment contained in this region D. The region in question resembles a disk.

To locate specific equipment 11, the invention proposes reducing the uncertainty of the location within the disk D, by a proposed IP-DSLAM location solution based on the equipment in the ADSL network. By applying the invention, this uncertainty disk D is reduced to a precision ring characterized by a minimum radius $R_{in}$ and a maximum radius $R_{out}$ where:

$R_{in}$ corresponds to the minimum distance estimated using a measurement of the speed between the user terminal (PC or mobile) and the DSLAM equipment of the network, and $R_{out}$ corresponds to the maximum distance estimated using a measurement of the speed between the user terminal (PC or mobile terminal) and the DSLAM equipment of the network.

Advantageously, it is possible to additionally use information on the circle sector SA between the DSLAM distributor and the building where the ADSL line is operating in order to further refine the location to inside the intersection LOC of this circle sector and said ring. This circle sector information SA can be obtained from the personnel in charge of setting up the local loop (pair of copper wires between each residence in a building and the first element of the carrier's network). More generally, a map can be established by conducting test measurements around the distributor device or by the topology configuration of the network around the distributor device. These measurements are conducted by the technicians in charge of making the trenches when installing the local loop between the distributor and the residence of a given user.

In one example utilization, a user can then connect to an Internet content site and obtain, because of the location features of the invention, a list of addresses (restaurants, theaters, ATM machines, etc.) near his residence within an area typically several hundred meters across (corresponding to the difference between the radii $R_{out}$ and $R_{in}$, according to the tests conducted). Ultimately, the extent of this region corresponds to a portion of the uncertainty ring estimated using the location solution of the invention, based on the attenuation of the ADSL signal and expressed in one example embodiment by a decrease in speed.

Figure 2:
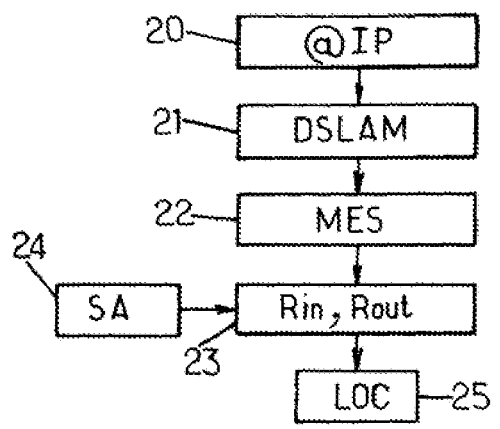
FIG. 2 illustrates the main steps of the method according to the invention, in an example embodiment.

The steps in an example method for such a location determination will now be described with reference to FIG. 2. First the connection of the equipment 11 is initiated, and in particular its IP address (or an IP address of the gateway 12) is identified in step 20, and associated in step 21 (by elements of the ADSL access network) with a given DSLAM distributor 10, in order to first determine a location within a disk D. In a next step 22, a speed measurement is initiated by an element of the ADSL access network or by a remote platform dedicated to this purpose (denoted 15 in FIG. 1). Once the speed has been measured, in step 23 an estimate of the distance is deduced from this, obtaining the radii $R_{in}$ and $R_{out}$ associated with the uncertainty ring estimated in this manner. In one example embodiment, this estimation of the radii can be obtained by measuring the speed and response time (or "ping") of an IP test packet sent from the platform 15 to the equipment 11 (or to the gateway 12) and returned by the latter to the platform 15, in said step 22. For this purpose, the platform 15 sends a test packet by sending means C1 and receives the return packet by receiving means C2, then measures the attenuation on the packet received which is expressed as a reduction in speed (possibly taking into account a ping response time), with the aid of measurement means MES, of course taking into account a typical speed loss between the distributor 10 and the platform 15.

Of course, the ping time is a basic example of a speed measurement technique. Other more sophisticated and/or complementary variants can be envisaged.

Once the uncertainty ring is defined using the speed measurements, the next step 24 can consist of using the circle sector information SA to refine the location to a region of defined accuracy LOC in step 25. As indicated above, the circle sector information SA can be stored in a database of correspondences between an ADSL line identifier and circle sector information determined by workers.

Figure 3:
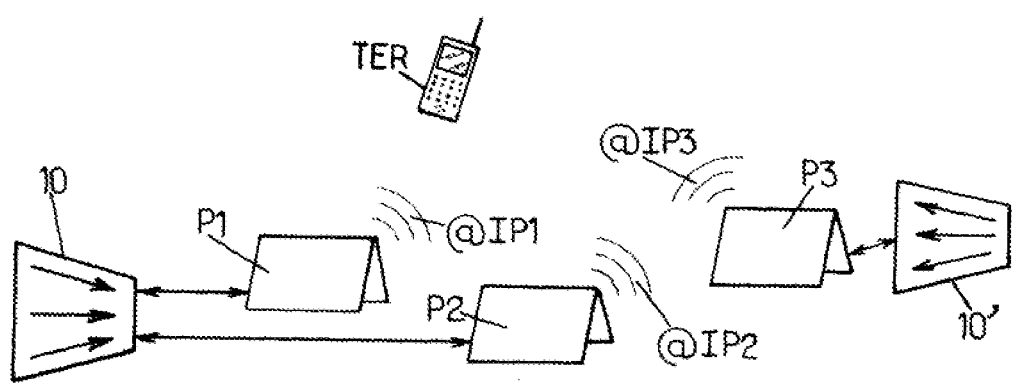
FIG. 3 illustrates the determination of a terminal's location when it is in a mobile situation.

The equipment 11 connected to the gateway 12 may be fixed or mobile. In particular, when the equipment 11 is a terminal TER that is in a mobile situation, as represented in FIG. 3, in the context of a short-range wireless connection of the terminal TER to several successive gateways, it is possible to locate within a succession of short-range local area networks the movements of this terminal as it borrows a succession of IP addresses assigned by the successive gateways, doing so namely by said dynamic determination of the IP address currently being used by the mobile terminal. This situation is represented in FIG. 3, in which the mobile terminal TER is capable of communicating (telephone call via VoIP or data communication) with a plurality of successive gateways P1, P2, P3 (via local area networks, for example using WiFi), by the respective assigned IP addresses @IP1, @IP2, @IP3. The first and second gateways P1, P2 are connected to the DSLAM multiplexer 10, but the second gateway P2 is further away from the distributor 10. One then detects a drop in the speed accessible to the terminal TER, which shows that the terminal is moving further away from the distributor 10. Then, in the example represented, the terminal TER is connected by a local area network to a new gateway P3 which assigns it the address @IP3. Here, the gateway P3 is connected to a DSLAM distributor 10' which is different from the distributor 10, and a measurement of the attenuation between the gateway P3 and this distributor 10' allows determining the location of the terminal TER using the address @IP3 within the immediate vicinity of the gateway P3 (in a short-range local area network).

Of course, the invention is not limited to the embodiment described above as an example; it applies to other variants.

For example, an attenuation measurement performed by the platform 15 was described above. More generally, however, such a measurement can be conducted by any element of the wide area network connected to the distributor 10. The invention then generally concerns an element of the wide area network which, for example, can be the platform 15.

Also presented above was the case of a location within a region LOC several hundred meters across. However, depending on the precision of the attenuation mapping, it is possible to locate the exact address of the equipment connected to an ADSL line, which allows considering applications other than providing a list of relevant addresses near the equipment. For example, the user can connect to an online purchasing site in order to have a product or service delivered and it is then possible to determine the location of his ADSL line transparently in order to find the exact address corresponding to his current location.

The invention claimed is:

1. A method for determining the location of equipment connected via a high-speed line to a distributor device of fixed and predetermined geographical position, comprising:
    measuring signal attenuation between the equipment and the distributor device,
    estimating the position of the equipment relative to the distributor device, deduced from said attenuation measurement, and
    mapping beforehand the signal attenuation around at least one distributor device, and determining the current location of the equipment within a sector around the distributor, by said attenuation measurement.

2. The method according to claim 1, wherein said attenuation measurement comprises measuring the speed on the line between the distributor device and the equipment.

3. The method according to claim 1, wherein the line is an ADSL line and the distributor device is a DSLAM multiplexer.

4. The method according to claim 1, wherein at least one IP address is assigned to the equipment, and said equipment, in communications, uses said IP address, the method comprising said attenuation measurement, performed thus for said IP address currently being used, in order to determine the location of the equipment.

5. The method according to claim 4, wherein a set of predetermined IP addresses is assigned to the equipment, and the equipment, in operation, uses at least one of said predetermined IP addresses, the method comprising:

a dynamic determination of the IP address currently being used by the equipment, and said attenuation measurement, for said IP address currently being used, in order to determine the location of the equipment.

6. The method according to claim 1, wherein said mapping is established by test measurements around the distributor device.

7. The method according to claim 1, wherein said mapping is established by the topology configuration of the network around the distributor device.

8. The method according to claim 1, wherein the equipment comprises a gateway to a short-range local area network, the method further comprising:

determining the location of a terminal connected by the short-range network to the equipment, said location of the terminal being comparable to the location of the gateway.

9. The method according to claim 8, wherein a plurality of terminals is connected to the equipment by the short-range network, and a set of predetermined IP addresses is assigned to the equipment, the equipment assigning to each terminal one of said predetermined IP addresses, the method comprising:

a dynamic determination of each IP address in the set currently being used by a terminal, and said attenuation measurement, for each IP address currently being used, in order to determine the location of each terminal connected to the equipment by the short-range network.

10. An element of a wide area telecommunications network, intended to be connected to a distributor device, comprising at least a measuring circuit for measuring the signal attenuation between telecommunications equipment connected via a high-speed line to said distributor device, and a processing circuit connected to measuring circuit for measuring a signal attenuation between the equipment and the distributor device, estimating the position of the equipment relative to the distributor device, deduced from said attenuation measurement, and mapping beforehand the signal attenuation around at least one distributor device, and determining the current location of the equipment within a sector around the distributor, by said attenuation measurement.

11. A non-transitory computer storage medium for storing a computer program instructions implementing the method according to claim 1, when this program is run by a processor.

* * * * *